(12) United States Patent
Han et al.

(10) Patent No.: US 10,965,489 B2
(45) Date of Patent: Mar. 30, 2021

(54) ARTIFICIAL INTELLIGENCE REFRIGERATOR AND METHOD FOR CONTROLLING THE SAME

(71) Applicant: LG ELECTRONICS INC., Seoul (KR)

(72) Inventors: Junsoo Han, Seoul (KR); Younghun Yang, Seoul (KR); Yonghwan Eom, Seoul (KR); Junseong Jeong, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/679,856

(22) Filed: Nov. 11, 2019

(65) Prior Publication Data

US 2020/0076640 A1 Mar. 5, 2020

(30) Foreign Application Priority Data

Aug. 30, 2019 (KR) .................. 10-2019-0107802

(51) Int. Cl.
*H04L 12/28* (2006.01)
*F25D 29/00* (2006.01)
(Continued)

(52) U.S. Cl.
CPC ........ *H04L 12/2825* (2013.01); *F25B 31/008* (2013.01); *F25B 39/04* (2013.01); *F25B 41/043* (2013.01); *F25D 29/005* (2013.01); *G06N 3/08* (2013.01); *F25D 2700/12* (2013.01); *H04L 2012/285* (2013.01)

(58) Field of Classification Search
None
See application file for complete search history.

(56) References Cited

U.S. PATENT DOCUMENTS 4,242,116 A * 12/1980 Aschberger ......... F16K 31/0606
137/625.5
9,857,414 B1 * 1/2018 Kabler ................ G01R 35/005
(Continued)

OTHER PUBLICATIONS

3GPP, 5G;NR;Physical Layer Procedures for data, 3GPP TS 38.214 v.15.2.0 Release 15, pp. 1-94 (Year: 2018).*

*Primary Examiner* — Backhean Tiv
(74) *Attorney, Agent, or Firm* — Lee, Hong, Degerman, Kang & Waimey PC

(57) ABSTRACT

Disclosed is an artificial refrigerator. The artificial refrigerator according to the present disclosure includes at least one sensor for sensing an operation state of the refrigerator and obtaining operation information about the operation state of the refrigerator and a processor that determines whether the operation state of the refrigerator is normal or abnormal using a deep-learning-based first diagnosis engine based on the operation information obtained using the at least one sensor and diagnoses, upon determination of the abnormality, a cause of the abnormality using a deep-learning-based second diagnosis engine. In the artificial refrigerator of the present invention, at least one of a user terminal or a server may be associated with an artificial intelligence module, a drone (Unmanned Aerial Vehicle, UAV) robot, an augmented reality (AR) device, a virtual reality (VR) device, a device related to a 5G service, and the like.

13 Claims, 14 Drawing Sheets

(51) Int. Cl.
*G06N 3/08* (2006.01)
*F25B 31/00* (2006.01)
*F25B 41/04* (2006.01)
*F25B 39/04* (2006.01)

(56) References Cited

U.S. PATENT DOCUMENTS

| | | | |
|---|---|---|---|
| 10,240,861 B2* | 3/2019 | Sugar | G08B 21/182 |
| 10,319,002 B1* | 6/2019 | Cardona | G06Q 30/0283 |
| 2012/0324918 A1* | 12/2012 | Bortoletto | F25B 5/00 62/73 |
| 2013/0098081 A1* | 4/2013 | Cur | F25D 11/006 62/117 |
| 2013/0226501 A1* | 8/2013 | Ghosh | H05K 7/20836 702/130 |
| 2014/0333322 A1* | 11/2014 | Kabler | G01D 4/008 324/511 |
| 2017/0004508 A1* | 1/2017 | Mansfield | G06Q 30/012 |
| 2017/0091870 A1* | 3/2017 | Trainor | G06Q 40/08 |
| 2018/0106532 A1* | 4/2018 | Sugar | G08B 21/182 |
| 2018/0268280 A1* | 9/2018 | Tokuchi | G06N 5/043 |
| 2018/0278197 A1* | 9/2018 | Kubo | H02P 29/60 |
| 2018/0285767 A1* | 10/2018 | Chew | G06N 20/00 |
| 2018/0340729 A1* | 11/2018 | Sugar | F25D 29/008 |
| 2019/0028608 A1* | 1/2019 | Kang | H04N 1/4413 |
| 2019/0050689 A1* | 2/2019 | Guo | G06K 9/66 |
| 2019/0072320 A1* | 3/2019 | Devi | G06N 5/041 |
| 2019/0121350 A1* | 4/2019 | Cella | H04L 67/12 |
| 2019/0196430 A1* | 6/2019 | Seo | G06Q 10/04 |
| 2019/0238358 A1* | 8/2019 | Hurewitz | H04L 12/4625 |
| 2019/0243735 A1* | 8/2019 | He | G06N 3/0445 |
| 2019/0266506 A1* | 8/2019 | Feldman | G06F 40/279 |
| 2019/0331409 A1* | 10/2019 | Jung | F25D 29/005 |
| 2019/0348044 A1* | 11/2019 | Chun | G06F 21/32 |
| 2019/0383865 A1* | 12/2019 | Sim | H04W 56/001 |
| 2019/0390897 A1* | 12/2019 | Lee | H04W 56/001 |
| 2020/0003482 A1* | 1/2020 | Kim | G06K 9/00771 |
| 2020/0003486 A1* | 1/2020 | Kim | F25D 23/12 |
| 2020/0003659 A1* | 1/2020 | Davies | G06N 3/084 |
| 2020/0018540 A1* | 1/2020 | Hwang | G05B 13/0265 |
| 2020/0025401 A1* | 1/2020 | Cheon | F24F 11/46 |
| 2020/0065596 A1* | 2/2020 | Maeng | G06K 9/00845 |
| 2020/0074295 A1* | 3/2020 | O'Donncha | G06K 9/6256 |
| 2020/0076640 A1* | 3/2020 | Han | F25B 49/02 |
| 2020/0080769 A1* | 3/2020 | Han | F25D 11/022 |
| 2020/0090410 A1* | 3/2020 | Han | G06K 9/6255 |
| 2020/0096253 A1* | 3/2020 | Han | G10L 21/0232 |
| 2020/0097776 A1* | 3/2020 | Kim | G06K 9/00771 |
| 2020/0118544 A1* | 4/2020 | Lee | G10L 15/005 |
| 2020/0133211 A1* | 4/2020 | Lee | G05B 13/048 |
| 2020/0175370 A1* | 6/2020 | Zhang | G06F 9/4881 |

* cited by examiner

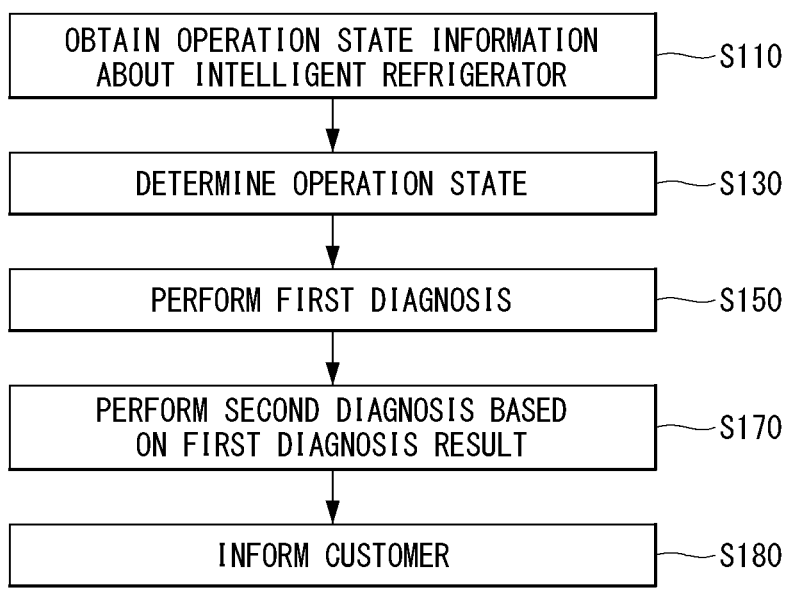
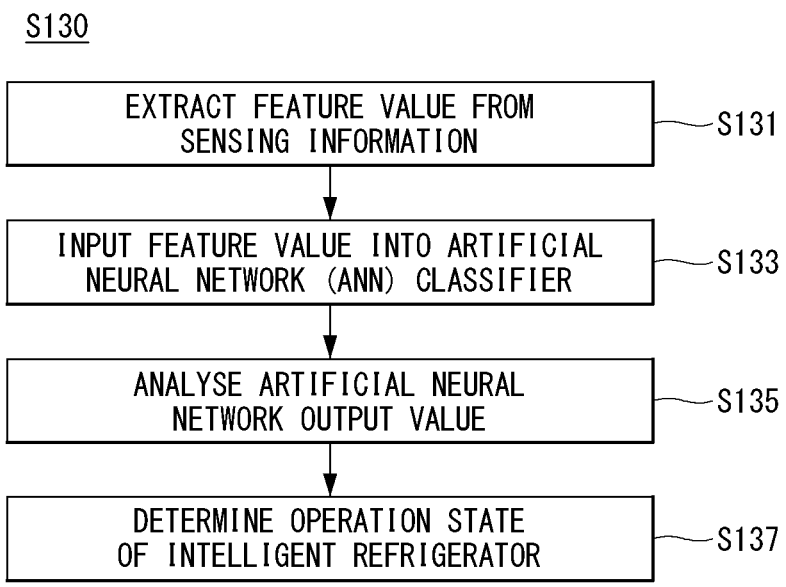

ARTIFICIAL INTELLIGENCE REFRIGERATOR AND METHOD FOR CONTROLLING THE SAME

Pursuant to 35 U.S.C. § 119(a), this application claims the benefit of earlier filing date and right of priority to Korean Patent Application No. 10-2019-0107802, filed on Aug. 30, 2019, the contents of which are hereby incorporated by reference herein in its entirety.

BACKGROUND OF THE INVENTION

Field of the Invention

The present disclosure relates to an intelligent refrigerator and a method for controlling the same, and more particularly to, an intelligent refrigerator and a method for controlling the same that may learn sensing information and operation information of the intelligent refrigerator to determine whether the operation state of the intelligent refrigerator is normal or abnormal using a first diagnosis engine and diagnose, upon determination of the abnormality, a cause of the abnormality using a deep-learning-based second diagnosis engine, thereby improving an accuracy of information to be transmitted to a customer and accurately diagnosing whether the abnormality is due to the erroneous-use of the customer or there is an abnormality in a product.

Related Art

In general, a refrigerator is an apparatus used for keeping an object-to-be-stored such as food, beverage, or the like fresh for a long time. Depending on a type of the object-to-be-stored, the object-to-be-stored is stored frozen or refrigerated.

The refrigerator is operated by an operation of a compressor provided therein. Cold air supplied into the refrigerator is produced by a heat exchange action of a refrigerant, continuously supplied into the refrigerator while repeatedly performing a cycle of compression, condensation, expansion, and evaporation. Then, the supplied refrigerant is evenly delivered into the refrigerator by convection, thereby storing the food inside the refrigerator at a desired temperature. The cycle depends on a configuration of the freezing cycle apparatus in the refrigerator.

Conventional refrigerators have caused food damage/economic damage due to abnormalities not recognized by customers.

Further, when an abnormality occurs in the conventional refrigerator, a cause of the abnormality of the refrigerator was not diagnoses at one time. Thus, time or economic damages of the customer occurred due to re-visit of service technician.

SUMMARY OF THE INVENTION

An object of the present disclosure is to solve the problems described above.

Further, another purpose of the present disclosure is to provide an intelligent refrigerator and a method for controlling the same that may learn sensing information and operation information of the intelligent refrigerator to determine whether the operation state of the intelligent refrigerator is normal or abnormal using a first diagnosis engine and accurately diagnose, upon determination of the abnormality, a cause of the abnormality using a deep-learning-based second diagnosis engine.

The intelligent refrigerator may further include a compressor connected to compress a refrigerant, a condenser connected to a discharge side of the compressor positioned downstream relative to a flow direction of the refrigerant, a first evaporator branched from the condenser and connected to a suction side of the compressor positioned upstream relative to the flow direction of the refrigerant, a second evaporator branched from the condenser together with the first evaporator, wherein the compressor exists between the first and second evaporators and the condenser, and a refrigerant switching valve installed at a point branched from an outlet of the condenser to the first evaporator and the second evaporator to control the flow direction of the refrigerant.

The operation information may include at least one of a freezing cycle temperature, operation information, a temperature, or a humidity.

The intelligent refrigerator may further include a communicator. The processor may transmit the operation information to a server in real time using the communicator, receive, via the communicator, first diagnosis information of determining whether the operation state of the refrigerator is normal or abnormal using the deep-learning-based first diagnosis engine from the server, and receive, via the communicator, second diagnosis information of diagnosing the cause of abnormality using the deep-learning-based second diagnosis engine upon the determination of the abnormality.

When the cause of the abnormality is erroneous-use of a customer, the processor may provide the customer with a solution approach to correct the cause of the abnormality.

The communicator may receive, from the server, a signal for allowing a remote action to be taken for preemptive response to prevent the abnormality of the operation state of the intelligent refrigerator under control of the processor.

The processor may request acquisition of a material for the cause of the abnormality in advance and then trigger dispatch of a service technician in a case of a cycle abnormality.

Among results of diagnosing window size sections in a deep-learning scheme in a predetermined time unit for a predefined time, when one diagnosis result of total diagnosis results is equal to or above a threshold value, the processor may select said one diagnosis result.

Among results of diagnosing window size sections in a deep-learning scheme in a predetermined time unit for a predefined time, when one diagnosis result of total diagnosis results is equal to or below a threshold value, the processor may defer said one diagnosis result.

The processor may receive, from a network, downlink control information (DCI) used to schedule transmission of the operation information sensed in the intelligent refrigerator. The sensed operation information may be transmitted to the network based on the DCI.

The processor may perform an initial access procedure to the network based on a synchronization signal block (SSB), the sensed operation information may be transmitted to the network using a physical uplink shared channel (PUSCH), and the SSB and a demodulation-reference signal (DM-RS) of the PUSCH may be quasi co-located (QCLed) for a QCL type D.

A method for controlling an intelligent refrigerator includes obtaining operation information about an operation state of the intelligent refrigerator, determining whether the operation state of the refrigerator is normal or abnormal using a deep-learning-based first diagnosis engine based on the obtained operation information, and diagnosing, upon determination of the abnormality, a cause of the abnormality using a deep-learning-based second diagnosis engine.

The operation information may include at least one of a freezing cycle temperature, operation information, a temperature, or a humidity.

The method may further include transmitting the operation information to a server in real time, receiving first diagnosis information of determining whether the operation state of the refrigerator is normal or abnormal using the deep-learning-based first diagnosis engine from the server, and receiving second diagnosis information of diagnosing the cause of abnormality using the deep-learning-based second diagnosis engine upon the determination of the abnormality.

The method may further include, when the cause of the abnormality is erroneous-use of a customer, providing the customer with a solution approach to correct the cause of the abnormality.

The method may further include receiving, from the server, a signal for allowing a remote action to be taken for preemptive response to prevent the abnormality of the operation state of the intelligent refrigerator.

The providing of the customer with the solution approach may include requesting acquisition of a material for the cause of the abnormality in advance and then triggering dispatch of a service technician in a case of a cycle abnormality.

The method may further include, among results of diagnosing window size sections in a deep-learning scheme in a predetermined time unit for a predefined time, when one diagnosis result of total diagnosis results is equal to or above a threshold value, selecting said one diagnosis result.

The method may further include, among results of diagnosing window size sections in a deep-learning scheme in a predetermined time unit for a predefined time, when one diagnosis result of total diagnosis results is equal to or below a threshold value, deferring said one diagnosis result.

Effects of the intelligent refrigerator according to the present disclosure are as follows.

Further, the present disclosure may determine whether the operation state of the intelligent refrigerator is normal or abnormal using the deep-learning-based first diagnosis engine based on the operation information of the refrigerator, diagnose, upon determination of the abnormality, the cause of the abnormality using the deep-learning-based second diagnosis engine to request the customer to take an action in case of the erroneous-use, and take the remote action for the preemptive response for preventing the abnormality. In the case of the cycle abnormality, the material for the cause of the abnormality may be secured in advance and then the abnormality may be corrected by the dispatch of the service technician.

Further, the present disclosure may determine whether the operation state of the intelligent refrigerator is normal or abnormal using the deep-learning-based first diagnosis engine based on the operation information of the refrigerator and diagnose, upon the determination of the abnormality, the cause of the abnormality using the deep-learning-based second diagnosis engine, thereby improving an accuracy of diagnosis of a product state.

Further, the present disclosure may determine whether the operation state of the intelligent refrigerator is normal or abnormal using the deep-learning-based first diagnosis engine based on the operation information of the refrigerator and diagnose, upon the determination of the abnormality, the cause of the abnormality using the deep-learning-based second diagnosis engine, thereby improving a stability of a system and an operation efficiency.

BRIEF DESCRIPTION OF THE DRAWINGS

FIG. 9 is a flowchart for illustrating a method for controlling an intelligent refrigerator according to an embodiment of the present disclosure.

FIG. 10 is a diagram for illustrating an example of determining an operation state of an intelligent refrigerator according to an embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
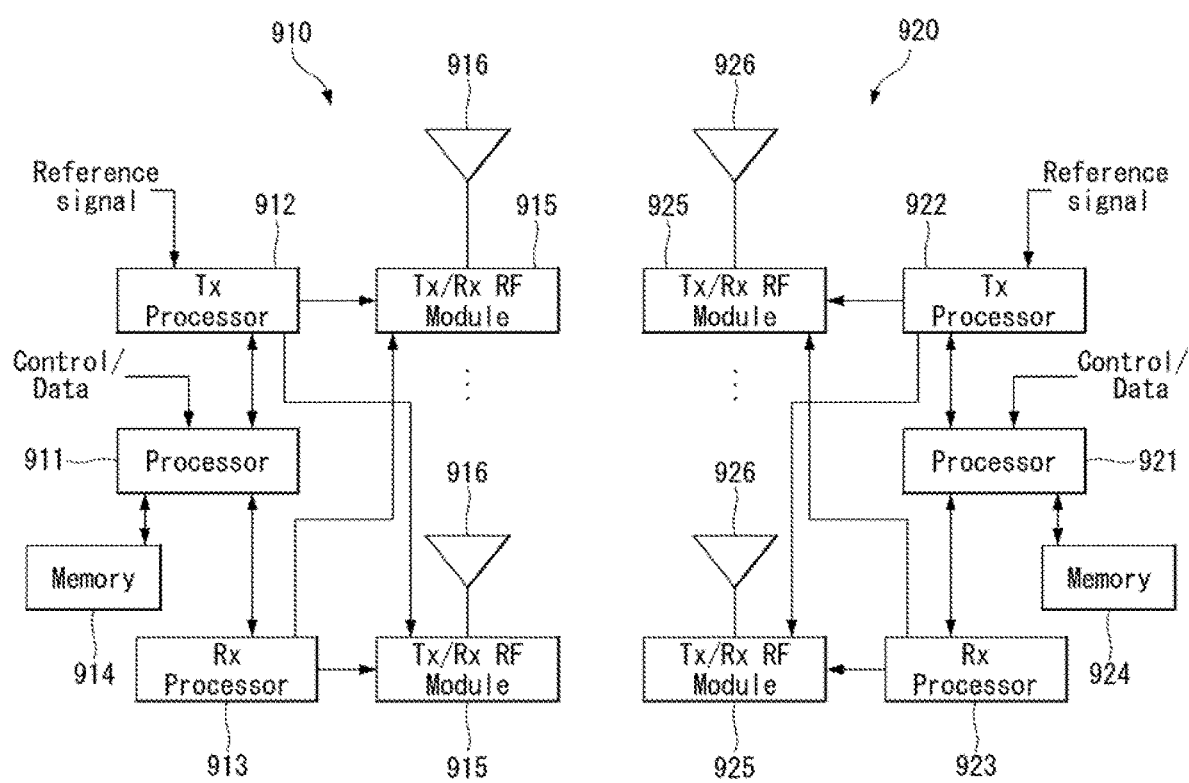
FIG. 1 illustrates a block diagram of a wireless communication system to which methods proposed in the present disclosure may be applied.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
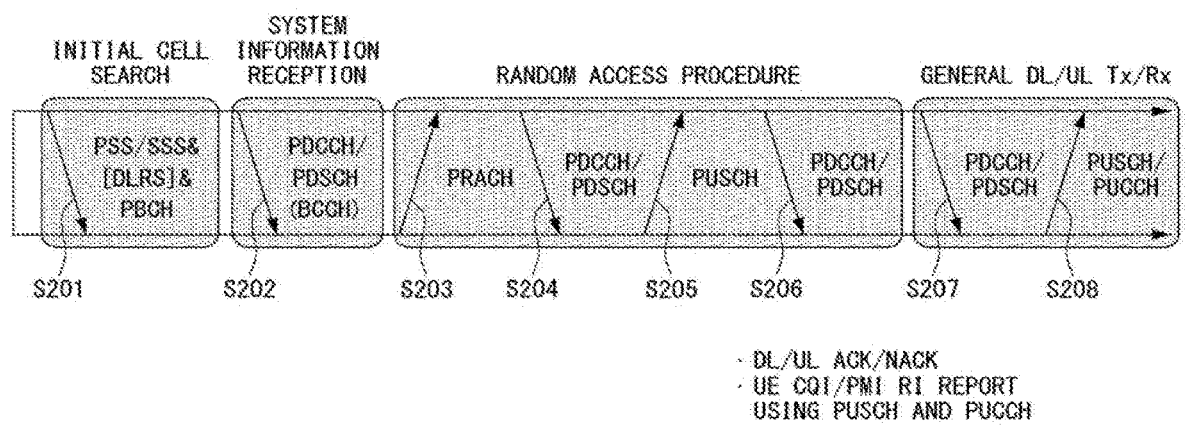
FIG. 2 illustrates an example of a method for transmitting/receiving a signal in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter.

When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Intelligent Refrigerators using 5G Communication

Figure 3:
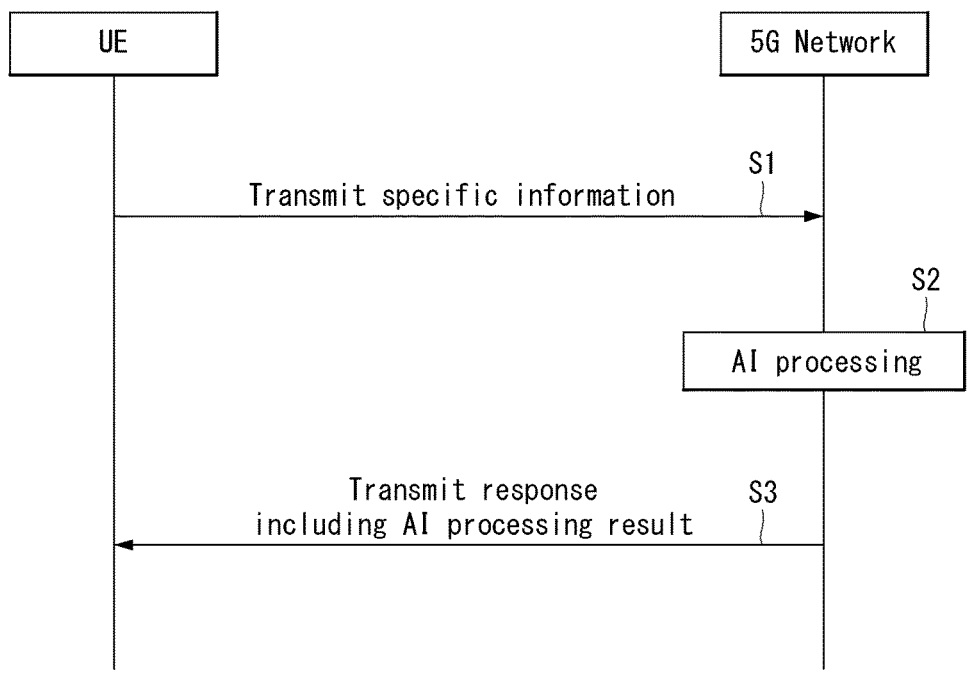
FIG. 3 illustrates an example of basic operations of a user terminal and a 5G network in a 5G communication system.

FIG. 3 shows an example of basic operations of an intelligent refrigerator and a 5G network in a 5G communication system.

The intelligent refrigerator transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the intelligent refrigerator (S3).

G. Applied Operations Between Intelligent Refrigerator and 5G Network in 5G Communication System Hereinafter, the operation of an intelligent refrigerator using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the intelligent refrigerator performs an initial access procedure and a random access procedure with the 5G network prior to step S1 of FIG. 3 in order to transmit/receive signals, information and the like to/from the 5G network.

More specifically, the intelligent refrigerator performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the intelligent refrigerator receives a signal from the 5G network.

In addition, the intelligent refrigerator performs a random access procedure with the 5G network for UL synchronization acquisition and/or UL transmission. The 5G network can transmit, to the intelligent refrigerator, a UL grant for scheduling transmission of specific information. Accordingly, the intelligent refrigerator transmits the specific information to the 5G network on the basis of the UL grant. In addition, the 5G network transmits, to the intelligent refrigerator, a DL grant for scheduling transmission of 5G processing results with respect to the specific information. Accordingly, the 5G network can transmit, to the intelligent refrigerator, information (or a signal) related to remote control on the basis of the DL grant.

Next, a basic procedure of an applied operation to which a method proposed by the present disclosure which will be described later and URLLC of 5G communication are applied will be described.

As described above, an intelligent refrigerator can receive DownlinkPreemption IE from the 5G network after the intelligent refrigerator performs an initial access procedure and/or a random access procedure with the 5G network. Then, the intelligent refrigerator receives DCI format 2_1 including a preemption indication from the 5G network on the basis of DownlinkPreemption IE. The intelligent refrigerator does not perform (or expect or assume) reception of eMBB data in resources (PRBs and/or OFDM symbols) indicated by the preemption indication. Thereafter, when the intelligent refrigerator needs to transmit specific information, the intelligent refrigerator can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the intelligent refrigerator receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the intelligent refrigerator transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
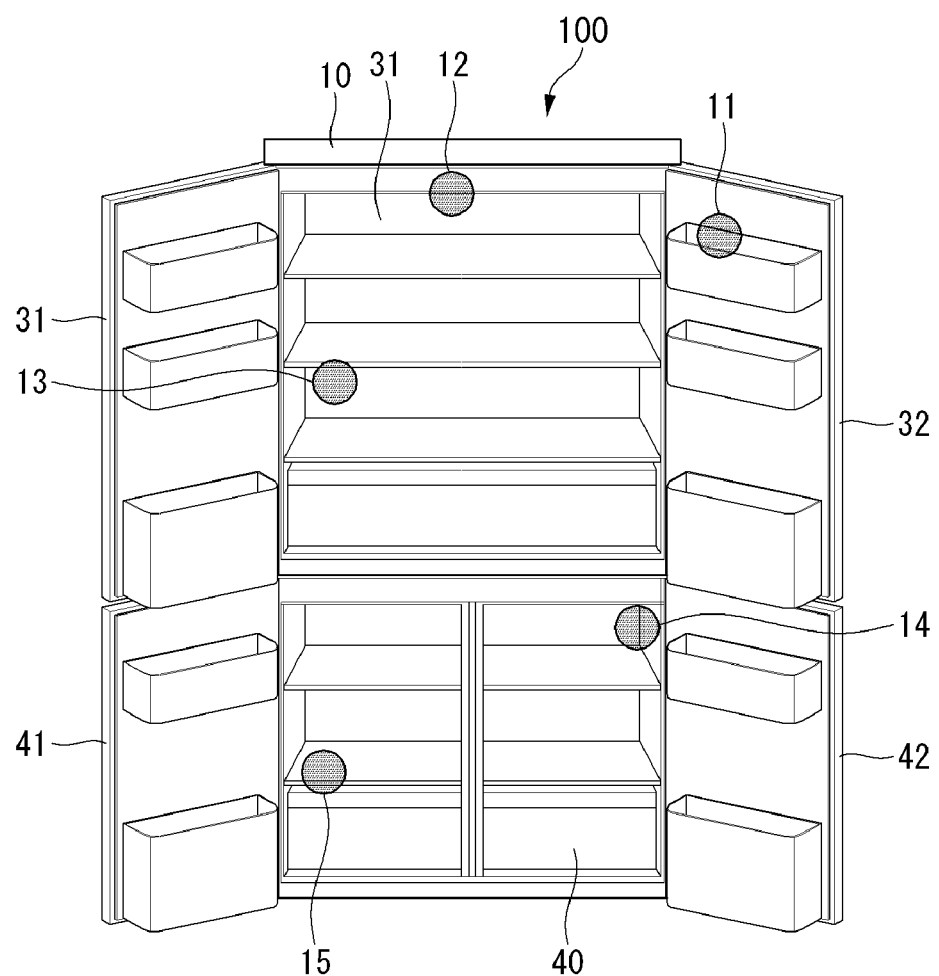
FIG. 4 illustrates an intelligent refrigerator according to an embodiment of the present disclosure.

FIG. 4 illustrates an intelligent refrigerator according to an embodiment of the present disclosure.

Referring to FIG. 4, an intelligent refrigerator 100 according to one embodiment of the present disclosure may include a refrigerator body 10 having a refrigerating compartment 30 and a freezing compartment 40 and refrigerating compartment doors 31 and 32 and freezing compartment doors 41 and 42 for opening and closing the refrigerating compartment 30 and freezing compartment 40 of the refrigerator body 10. The intelligent refrigerator 100 may include a plurality of refrigerating compartment temperature sensors 11, 12, and 13 for sensing temperature in the refrigerating compartment 30 and a plurality of freezing compartment temperature sensors 14 and 15 for sensing temperature in the freezing compartment 40.

At least one of the refrigerating compartment temperature sensor 11, 12, and 13 may be disposed in the refrigerating compartment 30. The refrigerating compartment temperature sensors 11, 12, and 13 may include a first temperature sensor 11 to a third temperature sensor 13. The first temperature sensor 11 to the third temperature sensor 13 may be spaced apart from each other. For example, the first temperature sensor 11 may be disposed near a hinge of the refrigerating compartment doors 31 and 32. The first temperature sensor 11 may sense outdoor temperature, humidity, or the like. The second temperature sensor 12 may be disposed on a ceiling of the refrigerating compartment 30. The second temperature sensor 12 may sense the refrigerating compartment temperature. The third temperature sensor 13 may be disposed in a central region of the refrigerating compartment 30. The third temperature sensor 13 may sense refrigerating compartment defrosting temperature.

At least one of freezing compartment temperature sensors 14 and 15 may be disposed in the freezing compartment 40. The freezing compartment temperature sensors 14 and 15 may include a fourth temperature sensor 14 and a fifth temperature sensor 15. The fourth temperature sensor 14 and the fifth temperature sensor 15 may be spaced apart from each other. For example, the fourth temperature sensor 14 may be disposed on a right wall of the freezing compartment. The fourth temperature sensor 14 may sense the freezing compartment temperature. The fifth temperature sensor 15 may be disposed in a central region of the freezing compartment. The fifth temperature sensor 15 may sense freezing compartment defrosting temperature.

Further, the intelligent refrigerator 100 may include a refrigerator processor (not shown) that is electrically connected to the refrigerating compartment temperature sensors 11, 12, and 13 and the freezing compartment temperature sensors 14 and 15, although not shown.

Figure 5:
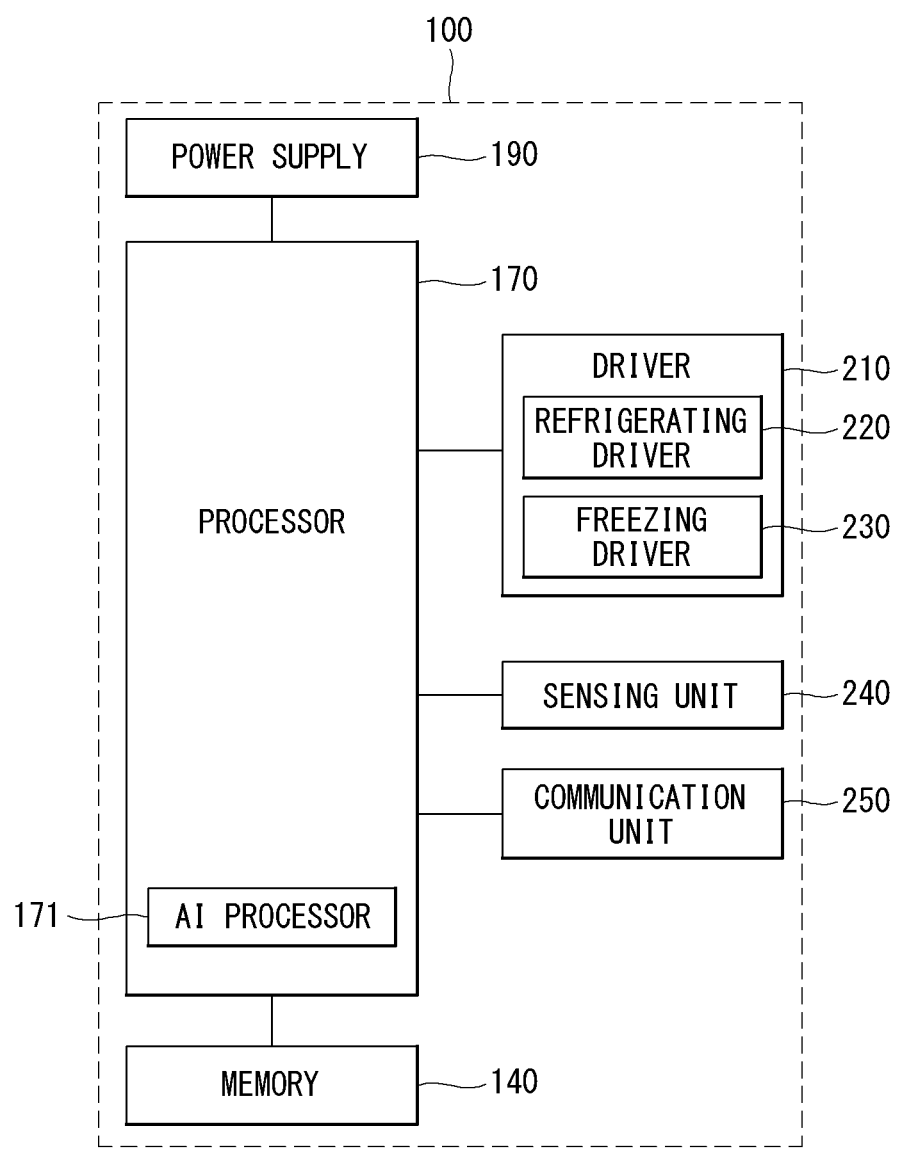
FIG. 5 is a block diagram of an intelligent refrigerator according to an embodiment of the present disclosure.

FIG. 5 is a block diagram of an intelligent refrigerator according to an embodiment of the present disclosure.

Referring to FIG. 5, the intelligent refrigerator 100 may include a memory 140, a processor 170, a power supply 190, a driver 210, a sensing unit 240, and a communication unit 250. Further, the processor 170 may further include an AI processor 171.

Further, the intelligent refrigerator 100 may include an interface connected wiredly or wirelessly to at least one electronic device provided in the refrigerator to exchange data for driving the refrigerator or controlling internal temperature. The interface may be configured with at least one of a communication module, a terminal, a pin, a cable, a port, a circuit, an element, or a device.

The memory 140 is electrically connected to the processor 170. The memory 140 may store basic data for a unit, control data for controlling an operation of the unit, and input/output data. The memory 140 may store data processed by the processor 170. The memory 140 may be at least one of a ROM, a RAM, an EPROM, a flash drive, or a hard drive, in hardware. The memory 140 may store various data for overall operations of the intelligent refrigerator 100, such as a program for processing or controlling the processor 170 or the like. For example, the memory 140 may store temperature information related to the temperatures of the refrigerating compartment and the freezing compartment, operation information related to the refrigerator operation, and the like.

The memory 140 may be integrated with the processor 170. According to an embodiment, the memory 140 may be classified as a subcomponent of the processor 170.

The power supply 190 may supply power to the intelligent refrigerator 100. The power supply 190 may receive power from a power source included in the intelligent refrigerator 100 and supply the power to each unit of the intelligent refrigerator 100. The power supply 190 may be operated based on a control signal provided from the processor 170. The power supply 190 may include an SMPS (switched-mode power supply).

The processor 170 may be electrically connected to the memory 140, the power supply 190, the sensing unit 240, the driver 210, and the communication unit 250 to exchange at least one control signal. The processor 170 may be implemented using at least one of ASICs (application specific integrated circuits), DSPs (digital signal processors), DSPDs (digital signal processing devices), PLDs (programmable logic devices), FPGAs (field programmable gate arrays), controllers, micro-controllers, microprocessors, or electrical units for performing other functions.

The processor 170 may be driven by the power provided from the power supply 190. The processor 170 may receive data, process the data, generate a signal, and provide the signal in a state powered by the power supply 190.

The processor 170 may receive information from another electronic device in the intelligent refrigerator 100 using the interface.

The processor 170 may provide the control signal to another electronic device in the intelligent refrigerator 100 using the interface.

The processor 170 may perform a normal operation to maintain the internal temperature of the refrigerating compartment or the internal temperature of the freezing compartment at a constant temperature, or perform a load response operation based on a change amount of the internal temperature of the refrigerating compartment or a change amount of the internal temperature of the freezing compartment based on a predefined time period. The processor 170 may be referred to as a refrigerator processor 170 or a refrigerator controller 170. Unlike the normal operation, the load response operation is an operation scheme in which a cooling-power is increased or decreased based on a load variation to operate the intelligent refrigerator 100 in a normal state.

The communication unit 250 may exchange signals with an external device of the intelligent refrigerator 100. The communication unit 250 may exchange signals with at least one of an infrastructure (for example, a server and a broadcasting station), a smart device, or a smart terminal. The communication unit 250 may include at least one of a transmission antenna, a reception antenna, an RF (Radio Frequency) circuit capable of implementing various communication protocols, or an RF element for performing communication.

The driver 210 may drive the intelligent refrigerator 100. The driver 250 may include at least one electronic control device (for example, a control ECU (Electronic Control Unit)). The driver 210 may include a refrigerating driver 220 and a freezing driver 230. The refrigerating driver 220 and the freezing driver 230 may control a compressor, an evaporator, and a condenser in the intelligent refrigerator 100.

The sensing unit 240 may sense the operation state of the intelligent refrigerator 100. The sensing unit 240 may include at least one of a temperature sensor, a humidity sensor, an ultrasonic sensor, or an illuminance sensor.

The intelligent refrigerator 100 may include an internal communication system (not shown). A plurality of electronic devices included in the intelligent refrigerator 100 may exchange various signals through the internal communication system 50. The various signals may include data. The internal communication system (not shown) may use at least one communication protocol (for example, a CAN, a LIN, a FlexRay, a MOST, and an Ethernet).

In one example, the intelligent refrigerator 100 according to the present disclosure may be provided with a freezing cycle device as needed.

Figure 6:
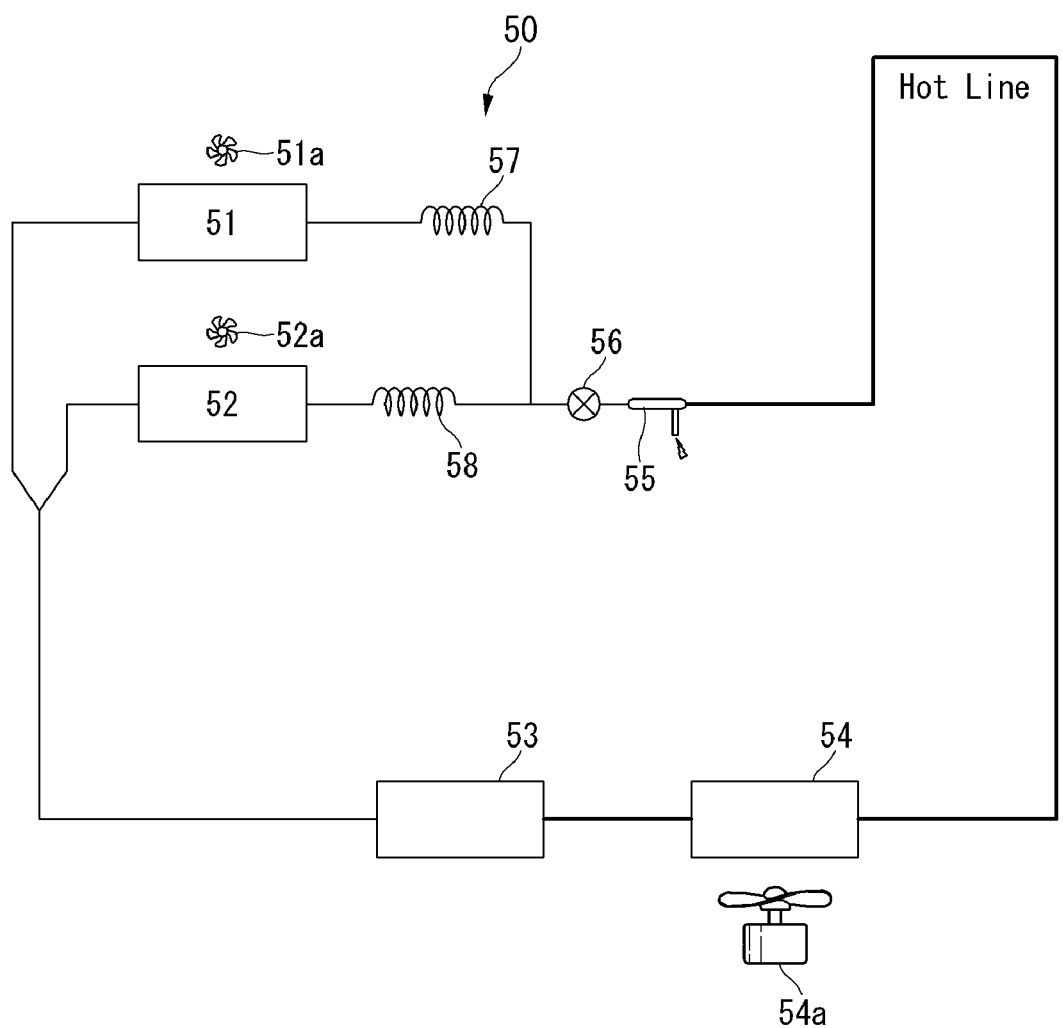
FIG. 6 illustrates a freezing cycle device controlled by a processor according to an embodiment of the present disclosure.

FIG. 6 illustrates a freezing cycle device controlled by a processor according to an embodiment of the present disclosure.

Although not shown, the intelligent refrigerator 100 may be equipped with a machine room at a lower side of the body. The freezing cycle device 50 may be installed in the machine room.

Figure 7:
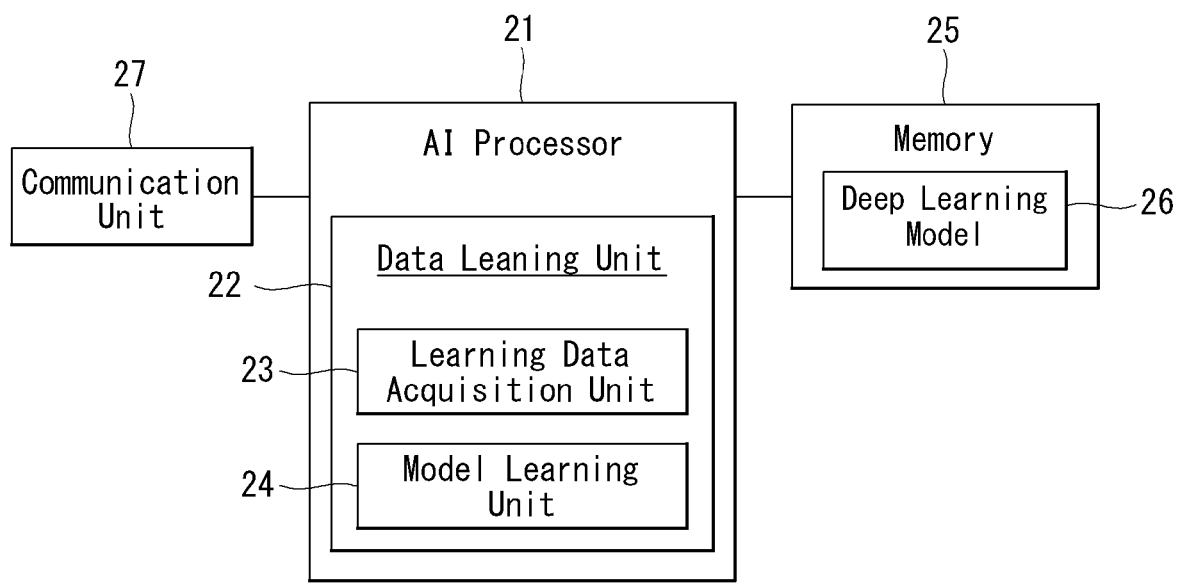
FIG. 7 is a block diagram of an AI device according to an embodiment of the present disclosure.

In FIG. 7, the processor 170 may be electrically connected to the freezing cycle device 50. The freezing cycle device 50 may generate cold air under control of processor 170.

The freezing cycle device 50 may include a compressor 53, evaporators 51 and 52, a condenser 54, and a refrigerant switching valve 56.

The compressor 53 may compress a refrigerant. In FIG. 6, there is only one compressor, but is not limited thereto. The compressor 53 may include a first compressor (not shown) and a second compressor (not shown). The first compressor (not shown) and the second compressor (not shown) may be connected to compress the refrigerant in two stages. That is, the refrigerant may be first-stage compressed by the first compressor (not shown) and then second-stage compressed by the second compressor (not shown).

The condenser 54 receive the refrigerant discharged from the compressor 53 and perform condensation. The condenser 54 may include a condensing fan 54*a*. The condensing fan 54*a* may be disposed around the condenser 54.

The evaporators 51 and 52 may include a first evaporator 51 and a second evaporator 52. The first evaporator 51 and the second evaporator 52 may be branched to a first branched pipe m1 and a second branched pipe m2 from an outlet of the condenser 54 and connected in parallel with each other. The first evaporator 51 may be referred to as a refrigerating compartment evaporator. The first evaporator 51 may include a refrigerating compartment fan 51*a*. The second evaporator 52 may be referred to as a freezing compartment evaporator 52. The second evaporator 52 may include a freezing compartment fan 52*a*.

The first branched pipe m1 may be disposed between the outlet of the condenser 54 and the first evaporator 221. The second branched pipe m2 may be disposed between the outlet of condenser 54 and the second evaporator 222.

At a branch point branched to the first branched pipe m1 and the second branched pipe m2, a refrigerant switching valve 56 for controlling a flow direction of the refrigerant may be installed. The refrigerant switching valve 56 may be installed at a point branched from the outlet of the condenser 54 to the first evaporator 221 and the second evaporator 222.

The refrigerant switching valve 56 may be a three-way valve. For example, the refrigerant switching valve 56 may be formed in a structure in which the outlet of the condenser 54 and the first evaporator 221 or the second evaporator 222 may be selectively communicated with each other or the first evaporator 221 and the second evaporator 222 may be simultaneously communicated with each other to control the flow direction of the refrigerant.

Further, expanders 57 and 58 for expanding the refrigerant may be included between the refrigerant switching valve 56 and the first and second evaporators 51 and 52. The expanders 57 and 58 may include a first expander 57 disposed between the refrigerant switching valve 56 and the first evaporator 221 and a second expander 58 disposed between the refrigerant switching valve 56 and the second evaporator 222.

A hot line and a drier may be arranged between the refrigerant switching valve 56 and the condenser 54.

The processor 170 may be electrically connected to the freezing cycle device 50 to control the refrigerating compartment temperature at time periods and the freezing compartment temperature at time periods.

The freezing cycle device 50 described above may operate under control of the processor 170.

An operation mode of the intelligent refrigerator 100 may use the refrigerant switching valve 56 under the control of the processor 170 to select the flow direction of the refrigerant to direct the refrigerant to the first evaporator 51 or to the second evaporator 52. Thus, the operation mode of the refrigerator may include a concurrent operation mode to operate the refrigerating compartment and the freezing compartment simultaneously, a freezing compartment operation mode to operate only the freezing compartment, or a refrigerating compartment operation mode to operate only the refrigerating compartment.

For example, when the operation mode of the refrigerator is the concurrent operation mode, the processor 170 may control the refrigerant switching valve 56 to open the first branched pipe m1 connected to the first evaporator 51 and open the second branched pipe m2 connected to the second evaporator 52. Thus, the refrigerant switching valve 56 distributes the refrigerant passing through the condenser 54 to the first evaporator 51 and the second evaporator 52. At the same time, all the compressors may be operated under the control of processor 170.

The refrigerant may pass through the first evaporator 51 and be sucked into the compressor 53. Further, the refrigerant compressed in the compressor 53 may be discharged.

Further, the refrigerant passed through the second evaporator 52 may be compressed in the compressor 53 and discharged. The refrigerant discharged from the compressor 53 may be moved to the condenser 54 and condensed in the condenser 54. Then, the refrigerant condensed in the condenser 54 repeats a series of cycles of being distributed to the first evaporator 221 and the second evaporator 222 from the refrigerant switching valve 56 and circulated.

Further, when the operation mode of the refrigerator is the refrigerating compartment operation, the processor 170 may control the refrigerant switching valve 56 to open the first branched pipe m1 connected to the first evaporator 51 and to block the second branched pipe m2 connected to the second evaporator 52. Thus, the refrigerant switching valve 56 may control the refrigerant passing through the condenser 54 to be circulated to the first evaporator 51.

When the operation mode of the refrigerator is the freezing compartment operation, the processor 170 may control the refrigerant switching valve 56 to block the first branched pipe m1 connected to the first evaporator 51 and to open the second branched pipe m2 connected to the second evaporator 52. Thus, the refrigerant switching valve 56 may control the refrigerant passing through the condenser 54 to be circulated to the second evaporator 52.

As described above, the processor 170 controls the intelligent refrigerator 100 to operate with an independent freezing cycle corresponding to the freezing compartment or refrigerating compartment load, thereby significantly improving an efficiency of the refrigerator by reducing unnecessary power consumption in the refrigerator.

The processor 170 may maintain a current cooling-power value of the compressor 53 when the change amount of the refrigerating compartment temperature or the change amount of the freezing compartment temperature is equal to or greater than a preset reference change amount at initial startup. Further, the processor 170 may increase the current cooling-power value of the compressor 53 when the change amount of refrigerating compartment temperature or the change amount of freezing compartment temperature is less than the reference change amount at the initial startup.

FIG. 7 is a block diagram of an AI device according to an embodiment of the present disclosure.

An AI device 20 may include an electronic device including an AI module that can perform AI processing, a server including the AI module, or the like. Further, the AI device 20 may be included as at least one component of the intelligent refrigerator 100 shown in FIG. 6 to perform together at least a portion of the AI processing.

The AI processing may include all operations related to driving of the intelligent refrigerator 100 shown in FIG. 6.

For example, the artificial intelligent refrigerator 100 can perform operations of processing/determining, and control signal generating by performing AI processing on sensing data. Further, for example, the artificial intelligent refrigerator 100 can control the internal temperature of the refrigerating compartment or the internal temperature of the freezing compartment by performing AI processing on data acquired through interaction with another electronic device disposed in the refrigerator.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to internal temperature of the artificial intelligent refrigerator 100. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, internal temperature data of the refrigerating compartment, internal temperature data of the freezing compartment, and/or external temperature data of the artificial intelligent refrigerator to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selecting unit can select only data about an object included in a specific period as learning data by performing detection for the specific period on data acquired through the internal temperature data of the refrigerating compartment, internal temperature data of the freezing compartment, and/or external temperature data of the artificial intelligent refrigerator.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an intelligent refrigerator. Further, the AI device 20 may be defined as another vehicle or a 5G network that communicates with the intelligent refrigerator. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 6 was functionally separately described into the AI processor 21, the memory 25, the communication unit 27, etc., but it should be noted that the aforementioned components may be integrated in one module and referred to as an AI module.

Figure 8:
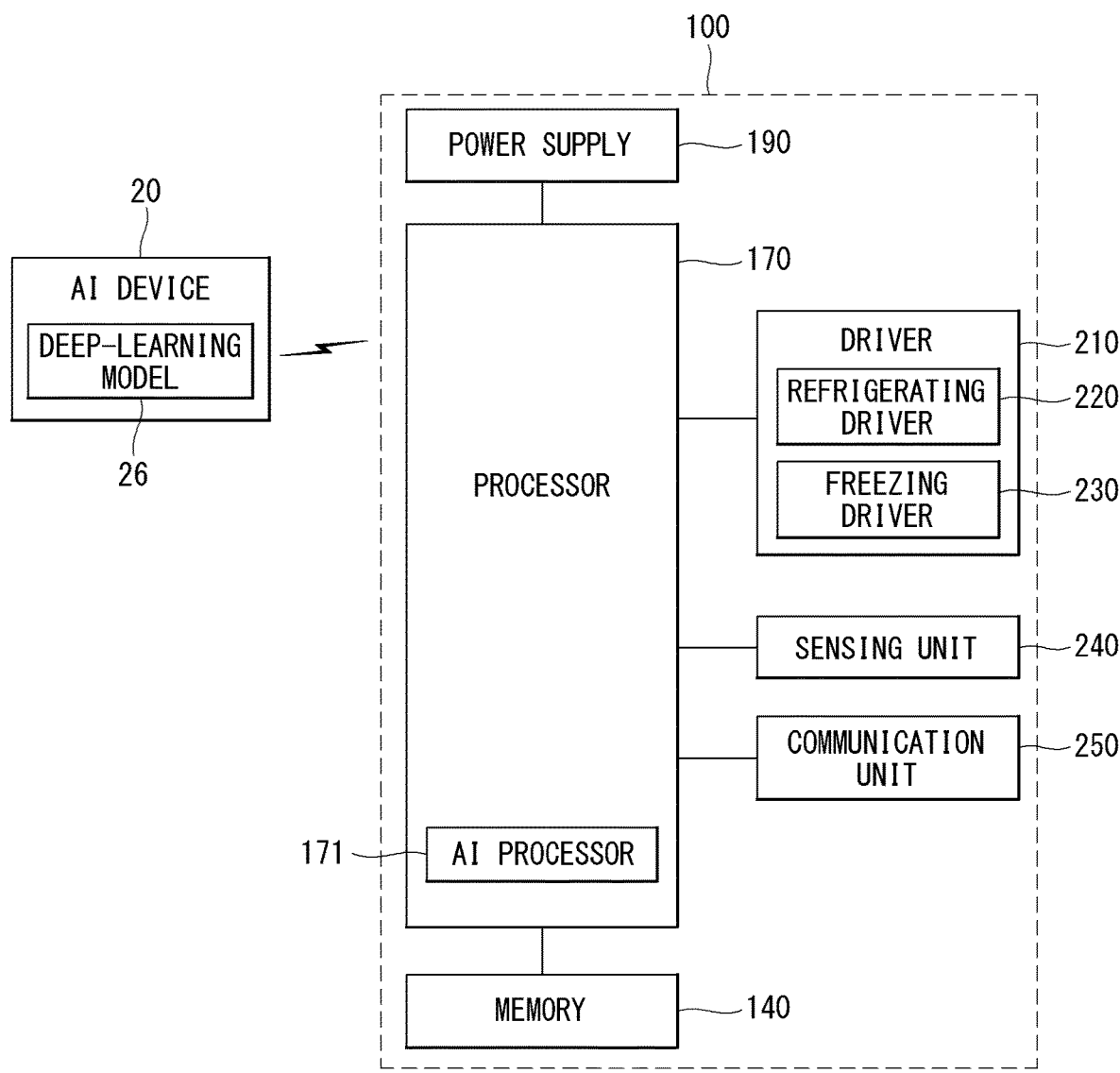
FIG. 8 is a diagram for illustrating a system in which an intelligent refrigerator and an AI device are associated with each other according to an embodiment of the present disclosure.

FIG. 8 is a diagram for illustrating a system in which an intelligent refrigerator and an AI device are associated with each other according to an embodiment of the present disclosure.

Referring to FIG. 8, the intelligent refrigerator 100 may transmit data that requires AI processing to the AI device 20 using a communication unit. The AI device 20 including a deep-learning model 26 may transmit an AI processing result using the deep-learning model 26 to the intelligent refrigerator 100. A description of the AI device 20 may refer to the content described with reference to FIG. 7.

The intelligent refrigerator 100 may include the memory 140, the processor 170, the power supply 190, the driver 210, the sensing unit 240, and the communication unit 250. In FIG. 8, since the components have substantially the same configurations, effects, and functions as the memory 140, the processor 170, the power supply 190, the driver 210, the sensing unit 240, and the communication unit 250 described in FIG. 5, a description thereof will be omitted.

The intelligent refrigerator 100 transmits data obtained using at least one sensor to the AI device 20 using the communication unit 250 and the AI device 20 applies a neural network model 26 to the transmitted data, thereby transmitting the generated AI processing data to the intelligent refrigerator 100. The intelligent refrigerator 100 may recognize detected or sensed information based on the received AI processing data and perform overall control operations for a door state of the intelligent refrigerator 100, the internal temperature of the intelligent refrigerator 100, and the intelligent refrigerator 100 using the recognized information.

The driver 210 may be a driving control signal generated by applying, by the AI processor 171, the neural network model to data related to the intelligent refrigerator 100. The driving control signal may be a signal received from the external AI device 20 via the communication unit 250.

The AI processor 171 may generate operation state data of the intelligent refrigerator 100 by applying the neural network model to sensing data generated from the at least one sensor. The AI processing data generated by applying the neural network model may include data on internal temperature of the refrigerator 100, data on internal humidity of the refrigerator 100, data on internal illuminance of the refrigerator 100, data on external temperature of the refrigerator 100, data on external humidity of the refrigerator 100, or the like.

The intelligent refrigerator 100 transmits the sensing data obtained using the at least one sensor to the AI device 20 via the communication unit 250 and the AI device 20 applies the neural network model 26 to the transmitted sensing data, thereby transmitting the generated AI processing data to the intelligent refrigerator 100.

According to one embodiment, the AI processor 171 may perform a deep-learning operation based on a plurality of data sensed by the sensing unit 240 and correct the data on the internal temperature of the intelligent refrigerator 100 based on the generated AI processing data.

The intelligent refrigerator 100 may include the internal communication system (not shown). The plurality of electronic devices included in the intelligent refrigerator 100 may exchange the signals through the internal communication system (not shown). The signals may include the data. The internal communication system (not shown) may use the at least one communication protocol (for example, the CAN, the LIN, the FlexRay, the MOST, and the Ethernet).

The AI processor 171 may apply temperature-related information received from the at least one sensor provided in the intelligent refrigerator 100 and the external device to the neural network model.

Hereinabove, schematic content of the 5G communication required for implementing the method for controlling the intelligent refrigerator 100 according to one embodiment of the present disclosure and of applying the 5G communication to perform the AI processing and transmit and receive the AI processing result has been described.

Hereinafter, a detailed method for determining the operation state of the refrigerator 100 based on the various sensing information obtained from the intelligent refrigerator 100 according to one embodiment of the present disclosure and passively or actively intervening in the determined result will be described with reference to the drawings.

FIG. 9 is a flowchart for illustrating a method for controlling an intelligent refrigerator according to an embodiment of the present disclosure.

Referring to FIG. 9, a method for controlling the intelligent refrigerator according to one embodiment of the present disclosure may include obtaining operation state information of the intelligent refrigerator, determining the operation state, performing a first diagnosis, performing a second diagnosis based on a first diagnosis result, and informing a customer. Hereinafter, a configuration of the device is referred to FIGS. 4 to 8.

The processor may obtain the operation state information about the intelligent refrigerator (S110). The processor may be provided with the sensing information using a plurality of sensors built in or mounted in the intelligent refrigerator to obtain the operation state information of the intelligent refrigerator.

The plurality of sensors may include a temperature sensor that may sense the internal or external temperature of the intelligent refrigerator, a humidity sensor that may sense the internal humidity or external humidity of the intelligent refrigerator, a vibration sensor that may sense noise, vibration, or the like occurred during the operation of the intelligent refrigerator, and the like. The sensing information may include data or information on the temperature of the intelligent refrigerator, the humidity of the intelligent refrigerator, and the vibration of the intelligent refrigerator The processor may determine the operation state of the intelligent refrigerator by analyzing and learning the obtained sensing information. A description of the determining of the operation state of the intelligent refrigerator will be described in detail in FIG. 10.

The processor may perform the first diagnosis on the operation state of the intelligent refrigerator based on the determination result of the operation state of the intelligent refrigerator.

The processor may perform the second diagnosis based on a first diagnosis result of the operation state of the intelligent refrigerator.

The processor may inform the customer of a second diagnosis result on the operation state of the intelligent refrigerator.

FIG. 10 is a diagram for illustrating an example of determining an operation state of an intelligent refrigerator according to an embodiment of the present disclosure.

Referring to FIG. 10, the processor may extract feature values from the sensing information obtained using the at least one sensor to diagnose the operation state of the intelligent refrigerator (S131). As the sensing information, the information about the operation state of the intelligent refrigerator may be obtained. For example, the processor may receive at least one of temperature information, humidity information, and vibration information from the at least one sensor (for example, the temperature sensor, the humidity sensor, and the vibration sensor). The processor 170 may extract a feature value from at least one of the temperature information, the humidity information, and the vibration information. The feature value is a value calculated to be represented specifically using the internal temperature of the intelligent refrigerator, ambient temperature/humidity of the intelligent refrigerator, the vibration of the intelligent refrigerator, or the like measured when the intelligent refrigerator is operated among at least one feature that may be extracted from the temperature information, the humidity information, and the vibration information.

The processor may control the feature values to be input into an artificial neural network (ANN) classifier that is trained to distinguish whether the operation of the intelligent refrigerator is normal or abnormal (S133).

The processor 170 may generate the operation state of the intelligent refrigerator by analyzing the extracted feature values. The operation state of the intelligent refrigerator may be input to the artificial neural network (ANN) classifier trained to distinguish whether the operation of the intelligent refrigerator is in a normal state or in an abnormal state based on the extracted feature values.

The processor 170 may analyze an output value of the artificial neural network (S135) and determine the operation state of the intelligent refrigerator based on the output value of the artificial neural network (S137).

The processor 170 may identify whether the operation of the intelligent refrigerator is in the normal or abnormal state from the output of the artificial neural network classifier.

In one example, FIG. 10 illustrates an example in which the operation of identifying the operation state of the intelligent refrigerator using the AI processing is implemented in the processing of the intelligent refrigerator, but the present disclosure is not limited thereto. For example, the AI processing may be performed on the 5G network based on the sensing information received from the intelligent refrigerator.

Figure 11:
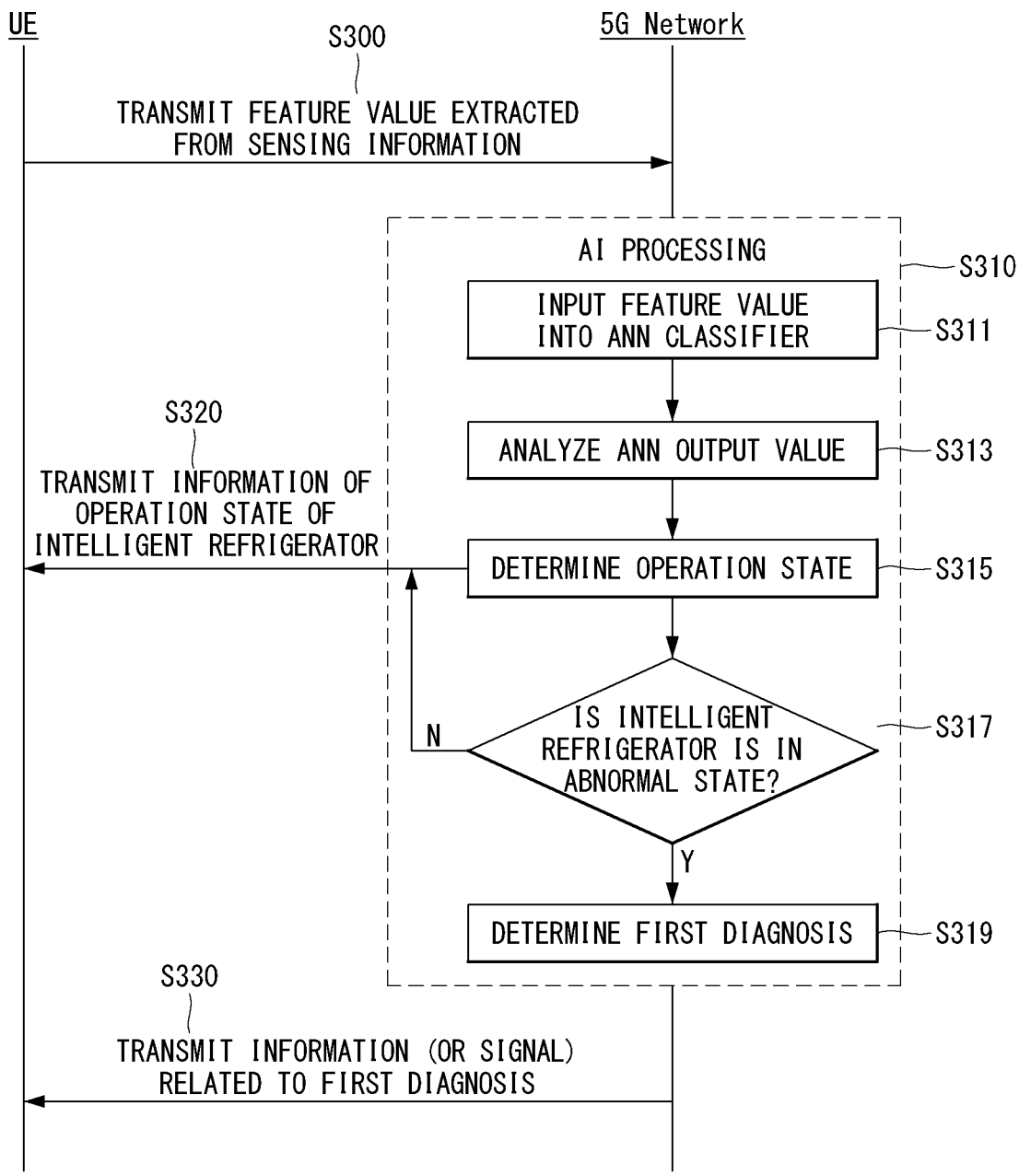
FIG. 11 is a diagram for illustrating another example of determining an operation state of an intelligent refrigerator according to an embodiment of the present disclosure.

FIG. 11 is a diagram for illustrating another example of determining an operation state of an intelligent refrigerator according to an embodiment of the present disclosure.

The processor 170 may control the communication unit to transmit state information of a carrying amount of the load to the AI processor included in the 5G network. Further, the processor 170 may control the communication unit to receive the AI processed information from the AI processor.

The AI processed information may be information of determining whether the operation state of the intelligent refrigerator is in the normal state or in a load abnormal state.

In one example, the intelligent refrigerator may perform an initial access procedure to the 5G network in order to transmit the operation state information of the intelligent refrigerator to the 5G network. The intelligent refrigerator may perform the initial access procedure to the 5G network based on a synchronization signal block (SSB).

Further, the intelligent refrigerator may receive, from the network, downlink control information (DCI) used to schedule transmission of the operation state information of the intelligent refrigerator obtained from the at least one sensor provided inside the intelligent refrigerator using a wireless communication unit.

The processor 170 may transmit the state information of the carrying amount of the load to the network based on the DCI.

The state information of the carrying amount of the load is transmitted to the network using a PUSCH, and a DM-RS of the SSB and the PUSCH may be QCLed for a QCL type D.

Referring to FIG. 11, the intelligent refrigerator may transmit the feature values extracted from the sensing information to the 5G network (S300).

In this connection, the 5G network may include the AI processor or the AI system, and the AI system of the 5G network may perform the AI processing based on the received sensing information (S310).

The AI system may input the feature values received from the intelligent refrigerator into the ANN classifier (S311). The AI system may analyze an ANN output value (S313) and determine the operation state of the intelligent refrigerator from the ANN output value (S315). The 5G network may transmit the operation state information of the intelligent refrigerator determined by the AI system to the intelligent refrigerator using the wireless communication unit.

In this connection, the operation state information of the intelligent refrigerator may include whether the operation state of the intelligent refrigerator is the normal state or the abnormal state or the like.

The AI system may determine the operation state of the intelligent refrigerator (S317). When it is determined that the operation state of the intelligent refrigerator is the normal state (S317), the AI system may transmit the operation state information of the intelligent refrigerator to the intelligent refrigerator (S320).

When it is determined that the operation state of the intelligent refrigerator is the abnormal state (S317), the AI system may determine the first diagnosis (S319). Further, the AI system may transmit information or a signal related to the first diagnosis to the intelligent refrigerator.

In one example, the intelligent refrigerator may transmit only the sensing information to the 5G network and extract a feature value corresponding to a malfunction detection input to be used as an input of the artificial neural network for determining the operation state of the intelligent refrigerator from the sensing information in the AI system included in the 5G network.

Figure 12:
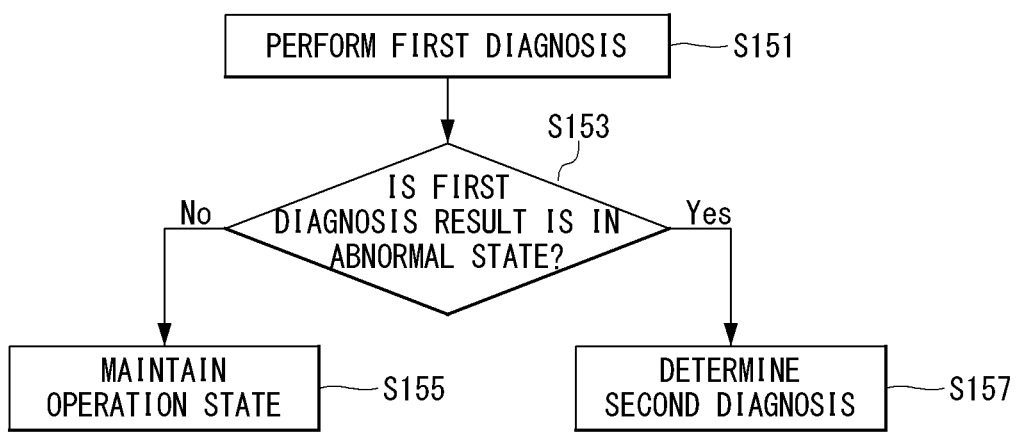
FIG. 12 illustrates a first diagnosis of an intelligent refrigerator according to an embodiment of the present disclosure.

FIG. 12 illustrates a first diagnosis of an intelligent refrigerator according to an embodiment of the present disclosure.

Referring to FIG. 12, the processor may learn the operation state information of the intelligent refrigerator to perform the first diagnosis (S151).

When it is determined that the operation state of the intelligent refrigerator is normal from the first diagnosis result (S153), the processor may maintain the operation state of the intelligent refrigerator (S155).

In contrast, when it is determined that the operation state of the intelligent refrigerator is abnormal from the first diagnosis result (S153), the processor may determine the second diagnosis for the intelligent refrigerator (S157).

Figure 13:
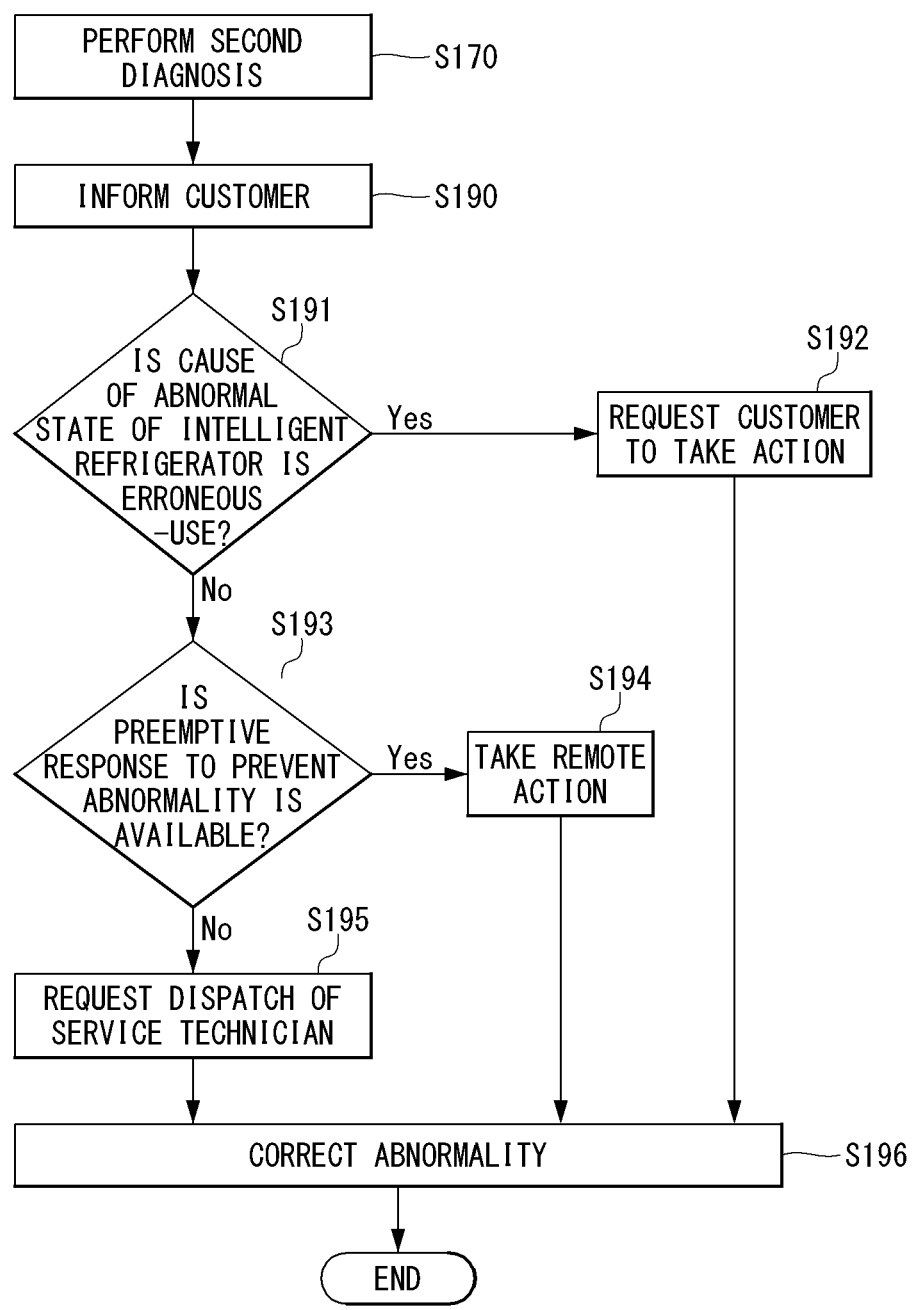
FIG. 13 illustrates a second diagnosis of an intelligent refrigerator according to an embodiment of the present disclosure.

FIG. 13 illustrates a second diagnosis of an intelligent refrigerator according to an embodiment of the present disclosure.

Referring to FIG. 13, when it is determined that the operation state of the intelligent refrigerator is abnormal from the result of learning the operation state information of the intelligent refrigerator and performing the first diagnosis, the processor may determine the second diagnosis for the intelligent refrigerator (S170).

When the second diagnosis is determined, the processor may use the communication unit to inform the customer or the user that the refrigerator's operation state is abnormal (S190). The processor may transmit a text indicating that the operation state of the refrigerator is the abnormal state to a smart device of the user. Alternatively, the processor may display that the operation state of the refrigerator is the abnormal state using a display mounted in the intelligent refrigerator.

The processor extracts normal data and abnormal data based on the operation state information of the intelligent refrigerator and learns the extracted normal and abnormal data to extract a cause of the abnormal state of the intelligent refrigerator based on the learned result.

When it is determined that the extracted cause of the abnormal state of the intelligent refrigerator is a simple erroneous-use (S191), the processor may transmit the customer a solution approach that may resolve the erroneous-use while informing the customer of information about the erroneous-use (S192). The solution approach may be transmitted to the customer's smart device or mobile device.

When it is determined that the extracted cause of the abnormal state of the intelligent refrigerator is not the simple erroneous-use (S191), the processor may determine whether to respond preemptively to prevent the abnormality. When it is determined that the preemptive response to prevent the abnormality is available (S193), the processor may wirelessly connect to a service center or service technician to take a remote action for the abnormality of the intelligent refrigerator (S194).

When it is determined that the preemptive response to prevent the abnormality is not available (S193), the processor may request dispatch of the service technician (S195).

As described above, the intelligent refrigerator may sense the operation information using the built-in sensor of the refrigerator, determine whether the operation state of the intelligent refrigerator is normal or abnormal using the deep-learning-based first diagnosis engine, diagnose, upon determination of the abnormality, the cause of the abnormality using the deep-learning-based second diagnosis engine to request the customer to take an action in case of the erroneous-use, and take the remote action for the preemptive response for preventing the abnormality. In a case of a cycle abnormality, a material for the cause of the abnormality may be secured in advance and then the abnormality may be corrected by the dispatch of the service technician.

In other words, the intelligent refrigerator may accurately diagnose the cause of the abnormal state using deep running and present the customer with various schemes corresponding to the diagnosis result to repair a failed intelligent refrigerator rapidly.

The present disclosure is not limited thereto, and the intelligent refrigerator may include a Wi-Fi module. An intelligent refrigerator with a built-in Wi-Fi module may transmit plurality of sensing information sensed using a plurality of sensors and operation information generated during an operation of the intelligent refrigerator to a cloud server in real time. For example, the intelligent refrigerator may transmit a normal data (pattern) or an abnormal data (pattern) to the cloud server in real time.

The server may determine whether the operation state of the intelligent refrigerator is normal or abnormal using the deep-learning-based first diagnosis engine based on the plurality of sensing information and the operation information provided in real time from the intelligent refrigerator and diagnose, upon the determination of the abnormality, the cause of the abnormality using the deep-learning-based second diagnosis engine.

The server may request the customer to take the action when the diagnosed cause of the abnormality is the erroneous-use and may take the remote action for the preemptive response for prevent the abnormality.

In contrast, in case of the cycle abnormality, the server may secure the material for the cause of the abnormality in advance and then dispatch the service technician.

Figure 14:
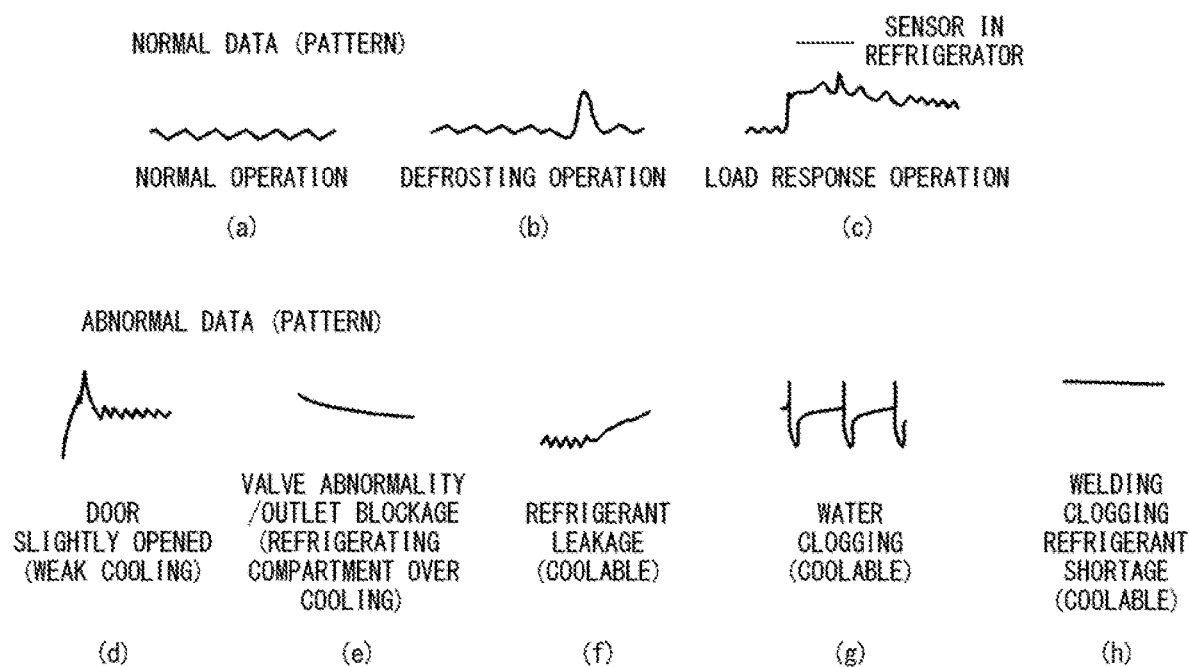
FIGS. 14 to 16 illustrate another example of a method for controlling an intelligent refrigerator that performs a deep-learning-based temperature abnormal diagnosis according to an embodiment of the present disclosure.
Figure 15:
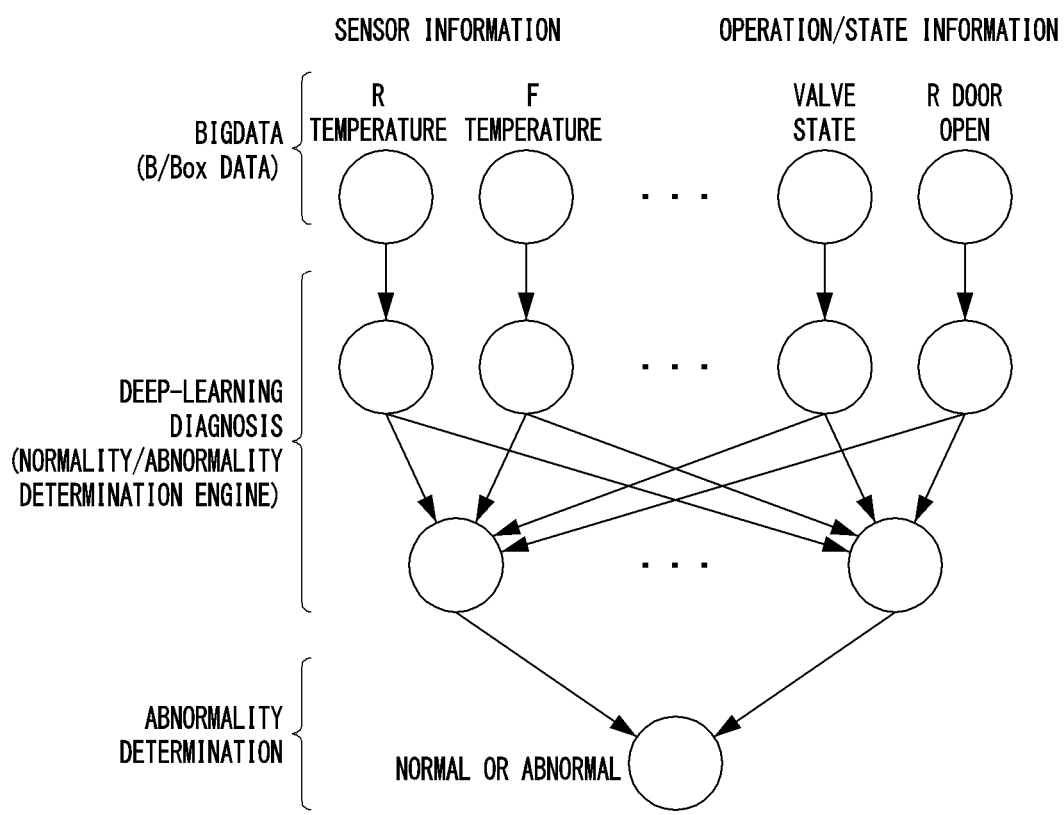
Figure 16:
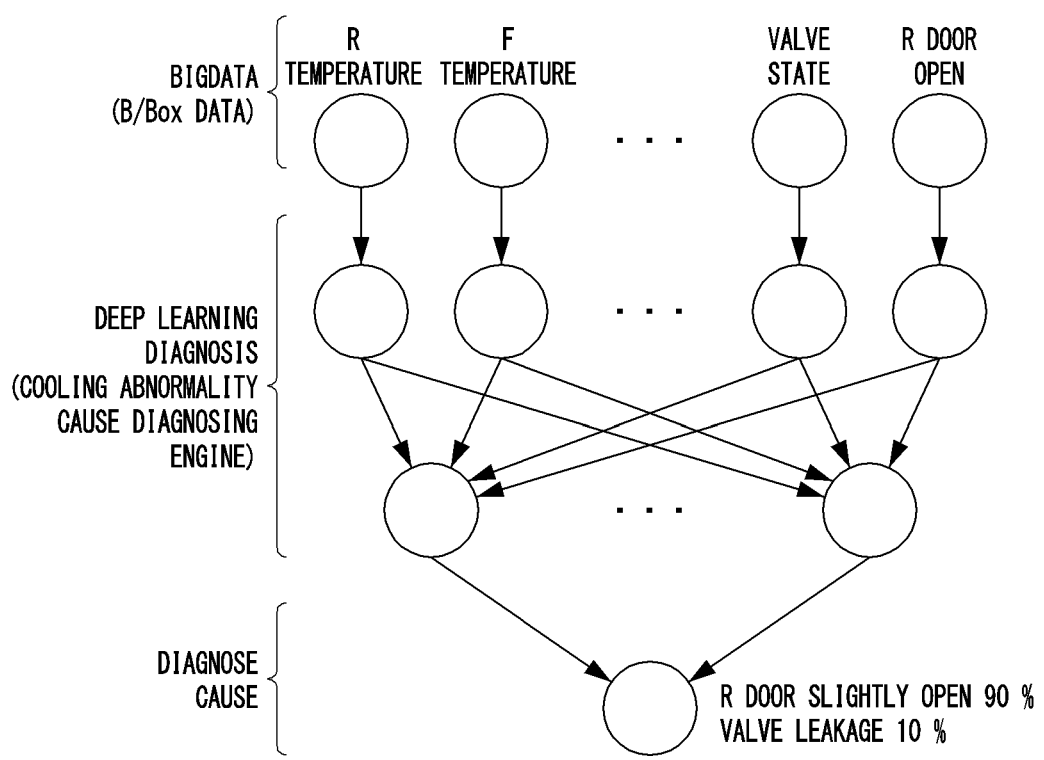

FIGS. 14 to 16 illustrate another example of a method for controlling an intelligent refrigerator that performs a deep-learning-based temperature abnormal diagnosis according to an embodiment of the present disclosure.

The intelligent refrigerator may sense the plurality of sensing information sensed using the plurality of sensors and the operation information generated during the operation of the intelligent refrigerator.

For example, the intelligent refrigerator may sense the normal data (pattern) or the abnormal data (pattern) in real time. Normal data sensed using the sensor inside the refrigerator may be expressed in a pattern such as (a) in FIG. 14 in a case of the normal operation, expressed in a pattern such as (b) in FIG. 14 in a case of a defrosting operation, and expressed in a pattern such as (c) in FIG. 14 in a case of a load response operation.

The abnormal data sensed using the sensor in the refrigerator may be expressed in a pattern such as (d) in FIG. 14 in a case in which a door is slightly opened, expressed in a pattern such as (e) in FIG. 14 in a case of valve abnormality/outlet blockage, expressed in a pattern such as (f) in FIG. 14 in a case of refrigerant leakage, expressed in a pattern such as (g) in FIG. 14 in a case of water clogging, and expressed in a pattern such as (h) in FIG. 14 in a case of refrigerant shortage.

FIGS. 15 and 16 illustrate examples of artificial neural network models related to the present disclosure, respectively.

Referring to FIGS. 15 and 16, the artificial neural network model is generally composed of an input layer, a hidden layer, and an output layer. Further, neurons included in each layer may be connected with each other using weight values. Using a linear combination of the weight values and neuron values and a nonlinear activation function, the artificial neural network model may have a shape that may approximate complex functions. A purpose of training the artificial neural network model is to find weight values that minimize a difference in values between an output computed in the output layer and an actual output.

A deep neural network may refer to an artificial neural network model composed of several hidden layers between an input layer and an output layer. Using a lot of hidden layers, complex nonlinear relationships may be modeled. Such neural network structure that may be highly abstracted by increasing the number of layers is referred to as deep-learning. The deep-learning may learn a large amount of data to choose an answer with the highest possibility based on the learning result when new data is input. Therefore, the deep-learning may be operated adaptively based on the input and may automatically find a characteristic factor in the process of training the model based on the data.

The deep-learning-based model may include various deep-learning schemes described above in FIG. 7 such as deep neural networks (DNN), convolutional deep neural networks (CNN), Recurrent Boltzmann Machines (RNN), Restricted Boltzmann Machines (RBM), deep belief networks (DBN), and Deep Q-network, but is not limited thereto. Further, a machine learning scheme in addition to the deep-learning may be included. For example, a feature of the input data may be extracted by applying the deep-learning-based model, and the machine learning-based model may be applied when classifying or recognizing the input data based on the extracted feature. The machine learning-based model may include a support vector machine (SVM), AdaBoost, and the like, but is not limited thereto.

Referring to FIG. 15, the artificial neural network model that performs the first diagnosis based on one embodiment of the present disclosure may include the input layer, the hidden layer, the output layer, and the weight value. The artificial neural network model for performing the first diagnosis may be referred to as a first diagnosis engine.

The sensor information, the operation state information, and the like may be input to the input layer. For example, the sensor information may include the temperature of the refrigerating compartment and the temperature of the freezing compartment. Further, the operation state information may include a valve state and a door opening state.

Neurons included in the hidden layer may be connected by a linear combination of neurons included in the input layer and individual weight values included in the weight values. For example, the hidden layer may be connected by a linear combination of the sensor information and the operation state information input from the input layer. The hidden layer may perform deep-learning diagnosis based on the linear combination of the neurons included in the input layer and the individual weight values included in the weight values. Whether the operation state of the intelligent refrigerator is the normal state or the abnormal state may be diagnosed.

Neurons included in the output layer may be connected by a linear combination of the neurons included in the hidden layer and the individual weights included in the weight values. Further, the artificial neural network model may derive a model that minimizes the difference in the values between the output computed in the output layer and the actual output. For example, the first diagnosis engine may use the hidden layer to determine the abnormality of the intelligent refrigerator based on the diagnosis result.

That is, the first diagnosis engine may determine how much the sensor information, the operation state information, and the like match the normal data or the normal pattern. The artificial neural network model may determine that the sensor information, the operation state information, and the like are normal when the sensor information, the operation state information, and the like are within a threshold value and may determine that the sensor information, the operation state information, and the like are abnormal when the sensor information, the operation state information, and the like are out of the threshold value.

Referring to FIG. 16, the artificial neural network model that performs the second diagnosis according to an embodiment of the present disclosure may include an input layer, a hidden layer, an output layer, and a weight value. The artificial neural network model that performs the second diagnosis may be referred to as a second diagnosis engine.

The sensor information, the operation state information, and the like may be input to the input layer. For example, the sensor information may include the temperature of the refrigerating compartment and the temperature of the freezing compartment. Further, the operation state information may include the valve state and the door opening state.

Neurons included in the hidden layer may be connected by a linear combination of neurons included in the input layer and individual weight values included in the weight values. For example, the hidden layer may be connected by a linear combination of the sensor information and the operation state information input from the input layer. The hidden layer may perform deep-learning diagnosis based on the linear combination of the neurons included in the input layer and the individual weight values included in the weight values. Whether the operation state of the intelligent refrigerator is the normal state or the abnormal state may be diagnosed. That is, the second diagnosis engine may diagnose a cause of the abnormality of the intelligent refrigerator.

Neurons included in the output layer may be connected by a linear combination of the neurons included in the hidden layer and the individual weights included in the weight values. Further, the artificial neural network model may derive a model that minimizes the difference in the values between the output computed in the output layer and the actual output. For example, the second diagnosis engine may diagnose the cause of the abnormality of the intelligent refrigerator based on a result of diagnosis of various abnormalities.

In other words, the second diagnosis engine may diagnose the cause of the abnormality by probabilistic determination of similarity with various abnormality cause patterns.

The trained artificial neural network model according to an embodiment of the present disclosure applies the information related to the temperature of the intelligent refrigerator as learning data. In this connection, the information related to the temperature of the intelligent refrigerator may include the information on the external/internal temperature of the refrigerating compartment, the information on the external/internal temperature of the freezing compartment, and the like. The artificial neural network model, which is repeatedly trained several times, may stop the learning when an error value becomes below a reference value and may be stored in the memory of the AI device. Using such trained artificial neural network model, when the information on the external/internal temperature of the refrigerating compartment and the information on the external/internal temperature of the freezing compartment related to the temperature of the intelligent refrigerator is input, the intelligent refrigerator may determine and classify types of the causes of the abnormalities based on corresponding information.

The intelligent refrigerator according to the present disclosure may perform the second diagnosis as shown in a table below.

TABLE 1

| DIAGNOSTIC ITEM | ABNORMAL PHENOMENON | CAUSE OF ABNORMALITY | ABNORMAL PHENOMENON DATE FEATURES |
|---|---|---|---|
| 3WAY VALVE ABNORMALITY | REFRIGERATING COMPARTMENT OVER COOLING | VALVE ABNORMALITY (ABNORMALITY BY OPENING OR FOREIGN MATERIAL) HARNESS MISCONNECTION | TEMPERATURE OF DEFROSTING SENSOR IN REFRIGERATING COMPARTMENT DROPS BELOW ZERO EVEN UNDER FREEZING COMPARTMENT OPERATION CONDITION |
| | FREEZING COMPARTMENT WEAK COOLING | | TEMPERATURE OF TEMPERATURE SENSOR OF REFRIGERATING COMPARTMENT DROPS BELOW ZERO (OCCURRENCE OF FOOD UP INSIDE REFRIGERATING COMPARTMENT) OPERATION TIME OF FREEZING COMPARTMENT INCREASES, AND IF SEVERE, FREEZING COMPARTMENT TEMPERATURE RISES (OCCURRENCE OF FREEZING COMPARTMENT WEAK COOLING) |
| CYCLE CLOGGING (WELDING) | REFRIGERATING ABNORMALITY | WELDING ABNORMALITY BLOCKAGE BY FOREIGN MATERIAL/PARTICLES IN CYCLE | TEMPERATURES OF SENSOR IN REFRIGERATOR AND DEFROSTING SENSOR RISE SIMULTANEOUSLY FROM TIME OF CLOGGING (COOLING ABNORMALITY) |
| | FREEZING ABNORMALITY REFRIGERATING/FREEZING ABNORMALITY | | THERE IS ALMOST NO TEMPERATURE DIFFERENCE BETWEEN DEFROSTING SENSOR AND SENSOR IN REFRIGERATOR BECAUSE NO REFRIGERANT FLOWS ΔT = 5° C. AT AVERAGE NORMAL OPERATION ΔT = 1° C. WHEN CLOGGING OCCURS |
| CYCLE CLOGGING (water) | FREEZING ABNORMALITY | FREEZING BY MOISTURE INFILTRATION | FREEZING COMPARTMENT SENSOR AND FREEZING COMPARTMENT DEFROSTING SENSOR ARE COOLED ONCE, AND TEMPERATURE DIFFERENCE THEREOF RISE WITHOUT TEMPERATURE DIFFERENCE BETWEEN FREEZING COMPARTMENT SENSOR AND FREEZING COMPARTMENT DEFROSTING SENSOR IN SAME WAY AS CLOGGING AND THEN COOLS DOWN TO AROUND 0° C. AFTER TEMPERATURE RISING IS STOPPED |
| DOOR SLIGHT OPEN (FREEZING COMPARTMENT) | WEAK FREEZING FREEZING ABNORMALITY (EVAPORATOR OCCLUSION) | SLIGHT OPENING DUE TO FOOD INTERFERENCE, INTERFERENCE WITH STRUCTURE IN REFRIGERATOR SLIGHT OPENING DUE TO FOOD INTERFERENCE, INTERFERENCE WITH STRUCTURE IN REFRIGERATOR LIFTED BY GASKET ABNORMALITY | AFTER DOOR OPENS, SPACING BETWEEN FREEZING COMPARTMENT DEFROSTING SENSOR AND FREEZING COMPARTMENT SENSOR BEGINS TO INCREASE THEN FREEZING COMPARTMENT DEFROSTING SENSOR TEMPERATURE DROPS AND FREEZING SENSOR TEMPERATURE RISES |
| DOOR SLIGHT OPEN (REFRIGERATING COMPARTMENT) | OVER REFRIGERATING REFRIGERATING ABNORMALITY (EVAPORATOR OCCLUSION) | SLIGHT OPENING DUE TO FOOD INTERFERENCE, INTERFERENCE WITH STRUCTURE IN REFRIGERATOR LIFTED BY GASKET ABNORMALITY | AFTER DOOR IS OPENED, TEMPERATURE OF REFRIGERATING COMPARTMENT DEFROSTING SENSOR DROPS AND TEMPERATURE OF REFRIGERATING COMPARTMENT SENSOR DROPS BELOW ZERO AFTER BEING MAINTAINED FOR LONG TIME, REFRIGERATING COMPARTMENT DEFROSTING SENSOR TEMPERATURE DROPS AND REFRIGERATION SENSOR TEMPERATURE RISES |
| REFRIGERATOR SENSOR OBSTRUCTION AND REFRIGERATING COMPARTMENT TOP OUTLET OBSTRUCTION | OVER REFRIGERATING | CASE IN WHICH REFRIGERATING SENSOR IS COMPLETELY OBSTRUCTED BY FOOD A ROUND SENSOR CASE IN WHICH REFRIGERATOR TOP OUTLET IS COMPLETELY COVERED BY FOOD | REFRIGERATING COMPARTMENT OPERATION TIME INCREASES AND DEFROSTING SENSOR TEMPERATURE SIGNIFICANTLY DROPS (DEFROSTING SENSOR TEMPERATURE DROPS BY WITHIN 10 DEGREES IN NORMAL CONDITION OF RT 25 DEGREES, DROPS BY AROUND 15 DEGREES IN CASE OF ABNORMALITY) |
| REFRIGERANT SHORTAGE | WEAK REFRIGERATING/FREEZING ABNORMALITY | REFRIGERANT INPUT AMOUNT ABNORMALITY | IT TAKES LONG TIME TO COOL DOWN TO INITIAL SATISFACTORY TEMPERATURE (60% OF OPTIMAL AMOUNT OF REFRIGERANT, COOLING SPEED IS SLOWED DOWN BY EQUAL TO OR MORE THAN TWICE REFRIGERATING COMPARTMENT, EQUAL TO OR MORE THAN 3 TIMES FREEZING COMPARTMENT) WHEN THERE IS NOT ENOUGH REFRIGERANT, TEMPERATURE IS NOT SATISFIED (EQUAL TO OR LESS THAN 40% OF OPTIMAL AMOUNT OF REFRIGERANT) |
| REFRIGERANT LEAKAGE | REFRIGERATING/FREEZING ABNORMALITY | WELDING PORTION LEAKAGE (MACHINE ROOM, EVAPORATOR) PIPING LEAKAGE DUE TO VIBRATION OR CORROSION | IN CASE OF LEAKAGE OF HIGH PRESSURE PORTION, REFRIGERATOR MACHINE ROOM PORTION COMPRESSOR INPUT SUDDENLY DROPS AND IMMEDIATELY DEFROSTING AND TEMPERATURE SENSOR RISES CONTINUOUSLY IN CASE OF LEAKAGE OF LOW PRESSURE PORTION, REFRIGERATOR COOLER PORTION COMPRESSOR INPUT IS MORE THAN DOUBLED AND DEFROSTING AND TEMPERATURE SENSORS RISE CONTINUOUSLY AFTER SEVERAL HOURS |

As described above, in the present disclosure, the deep-learning-based diagnosis engine may be used to transmit the sensor and the operation information of the refrigerator with the built-in Wi-Fi module to the cloud server in real time. Then, the server may determine whether the operation state of the refrigerator is normal or abnormal using the deep-learning-based first diagnosis engine, diagnose, upon the determination of the abnormality, the cause of the abnormality using the deep-learning-based second diagnosis engine to request the customer to take an action in case of the erroneous-use, and take the remote action for the preemptive response for preventing the abnormality. In a case of the cycle abnormality, the material for the cause of the abnormality may be secured in advance and then the abnormality may be corrected by the dispatch of the service technician.

In the present disclosure, when using the deep-learning-based diagnosis engine to diagnose the state of the refrigerator using data on freezing cycle temperature, operation information, and state, the deep-learning engine learns changes in the refrigerator state using not only data of a moment at which the diagnosis to be performed but also data of past before a predetermined time.

Then, deep-learning inference results are collected and summarized for a predetermined time to produce a final diagnosis result to distinguish a normal operation that may be seen as abnormal instantaneously due to excessive use of the refrigerator.

Thus, an accuracy of information delivered to the customer may be improved and whether the abnormality is due to the erroneous-use of the customer or there is an abnormality in the product may be determined.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. An artificial intelligence (AI) refrigerator comprising:
a communicator;
at least one sensor configured to sense an operation state of the refrigerator and obtain operation information about the operation state of the refrigerator; and
one or more processors configured to:
obtain a determination on whether the operation state of the refrigerator is normal or abnormal based on a deep-learning-based first diagnosis model using the operation information obtained using the at least one sensor; and
obtain a diagnosis, when an abnormality is determined, wherein the diagnosis includes a cause of the abnormality using a deep-learning-based second diagnosis model,
wherein the one or more processors is further configured to:
transmit the operation information to a server using the communicator;
obtain the determination on whether the operation state of the refrigerator is normal or abnormal by receiving from the server, via the communicator, first diagnosis information determined by the server on whether the operation state of the refrigerator is normal or abnormal based on the deep-learning-based first diagnosis model; and
obtain the diagnosis by receiving from the server, via the communicator, second diagnosis information determined by the server including the cause of the abnormality using the deep-learning-based second diagnosis model,
wherein when the cause of the abnormality is determined to be user-caused, the one or more processors is further configured to provide a user with a solution method for correcting the cause of the abnormality, and
wherein the one or more processors is configured to request, in advance of a next occurrence of a repeating abnormality, acquisition of materials for addressing the abnormality in advance and request dispatch of a service technician for the next occurrence of the repeating abnormality.

2. The AI refrigerator of claim 1, further comprising:
a compressor configured to compress a refrigerant;
a condenser connected to a discharge side of the compressor to receive the refrigerant discharged from the condenser;
a first evaporator and a second evaporator each separately connected to an outlet line of the condenser, wherein output of the first and second evaporators are connected to a suction side of the compressor; and
a refrigerant switching valve positioned at the outlet line of the condenser and configured to control the flow direction of the refrigerant toward the first evaporator or the second evaporator.

3. The AI refrigerator of claim 1, wherein the operation information includes at least one of a freezing cycle temperature, operation information, a temperature, or a humidity.

4. The AI refrigerator of claim 1, wherein the one or more processors are further configured to receive from the server, via the communicator, a signal for allowing performance of a preemptive remote action for preventing the abnormality of the operation state of the intelligent refrigerator.

5. The AI refrigerator of claim 1,
wherein if a diagnosis result of the deep-learning-based first diagnosis model is equal to or less than a threshold value, the one or more processors are configured to determine the diagnosis result as normal.

6. The AI refrigerator of claim 5,
wherein if the diagnosis result of the deep-learning-based first diagnosis model exceeds the threshold value, the one or more processors are configured to determine the diagnosis result as abnormal.

7. The AI refrigerator of claim 1, further comprising a communicator, wherein the one or more processors is further configured to receive, from a network via the communicator, downlink control information (DCI) used to schedule transmission of operation information; and
transmit, to the network via the communicator, the obtained operation information about the sensed operation state based on the DCI.

8. The AI refrigerator of claim 7, wherein the one or more processors is further configured to perform an initial access procedure to the network based on a synchronization signal block (SSB), wherein the obtained operation information is transmitted to the network via the communicator using a physical uplink shared channel (PUSCH), and wherein the SSB and a demodulation-reference signal (DM-RS) of the PUSCH is quasi co-located (QCLed) for a QCL type D.

9. A method for controlling an artificial intelligence (AI) refrigerator, the method comprising:

obtaining operation information about an operation state of the intelligent refrigerator;

obtaining a determination on whether the operation state of the refrigerator is normal or abnormal based on a deep-learning-based first diagnosis model based on the obtained operation information;

obtaining a diagnosis, when an abnormality is determined, wherein the diagnosis includes a cause of the abnormality using a deep-learning-based second diagnosis model, transmitting the operation information to a server in real time;

obtaining the determination on whether the operation state of the refrigerator is normal or abnormal by receiving, from the server, first diagnosis information, determined by the server, on whether the operation state of the refrigerator is normal or abnormal based on the deep-learning-based first diagnosis model;

obtaining the diagnosis by receiving, from the server, second diagnosis information of the cause of the abnormality using the deep-learning-based second diagnosis model;

when the cause of the abnormality is determined to be user-caused, providing a user with a solution method for correcting the cause of the abnormality; and requesting, in advance of a next occurrence of a repeating abnormality, acquisition of materials for addressing the abnormality in advance and requesting dispatch of a service technician for the next occurrence of the repeating abnormality.

10. The method of claim 9, wherein the operation information includes at least one of a freezing cycle temperature, operation information, a temperature, or a humidity.

11. The method of claim 9, further comprising:

receiving, from the server, a signal for allowing performance of a preemptive remote action for preventing the abnormality of the operation state of the intelligent refrigerator.

12. The method of claim 9, further comprising:

wherein if a diagnosis result of the deep-learning-based first diagnosis model is equal to or less than a threshold value, determining the diagnosis result as normal.

13. The method of claim 12, further comprising:

wherein if the diagnosis result of the deep-learning-based first diagnosis model exceeds the threshold value, determining the diagnosis result as abnormal.

\* \* \* \* \*